United States Patent [19]

Frazier

[11] Patent Number: 5,446,461
[45] Date of Patent: Aug. 29, 1995

[54] CONCRETE PENETRATING IMAGING RADAR

[75] Inventor: Lawrence M. Frazier, West Covina, Calif.

[73] Assignee: Hughes Missile Systems Company, Los Angeles, Calif.

[21] Appl. No.: 234,211

[22] Filed: Apr. 28, 1994

[51] Int. Cl.⁶ .................... G01S 13/08; G01S 13/90
[52] U.S. Cl. ................................ 342/22; 342/133
[58] Field of Search ............... 342/22, 25, 133, 156

[56] References Cited

U.S. PATENT DOCUMENTS

| | | | |
|---|---|---|---|
| 4,675,677 | 6/1987 | von Maydell et al. | 342/25 |
| 5,229,774 | 7/1993 | Komatsu | 342/128 X |
| 5,339,080 | 8/1994 | Steinway | 342/22 |
| 5,345,240 | 9/1994 | Frazier | 342/28 |

*Primary Examiner*—Mark Hellner
*Attorney, Agent, or Firm*—Charles D. Brown; Randall M. Heald; Wanda K. Denson-Low

[57] ABSTRACT

An imaging radar system for generating images of objects disposed behind an obscuring structure. The system comprises a low power, frequency tunable, continuous wave transmitter and an antenna array coupled to the transmitter that includes a transmit antenna and a plurality of receive antennas. A radar receiver is coupled to the antenna array, and a computer processor is coupled to the radar receiver that comprises a digital signal processor and a computer. A radar display is coupled to the computer for displaying the images of the objects disposed behind an obscuring structure. A power source is coupled to the antenna array, the transmitter, the radar receiver, and the computer processor for providing power thereto. Time difference of arrival processing is performed in the computer for providing radar angle scanning upon receipt of radar return signals from the objects using the antenna array. The present radar provides angle resolution on the order of 5 to 10 degrees, depending upon the spacing of the antennas.

13 Claims, 4 Drawing Sheets

CONCRETE PENETRATING IMAGING RADAR

BACKGROUND

The present invention relates generally to radars, and more particularly to imaging radars for producing radar images of objects that are located behind obscuring structures, such as concrete and stucco barriers, and the like.

The surveillance of areas which are restricted from optical view can be of great help to law enforcement and military personnel. Law enforcement officials have a need to identify and locate persons inside concrete and stucco buildings, and the like. Impulse radar has been highly touted for use in this application, but has had many problems, such as interference from television and other communications transmitters.

The present imaging radar is an adaptation of the concepts used in a three dimensional imaging radar developed by the assignee of the present invention, and described in U.S. patent application Ser. No. 08/028,451, filed Mar. 9, 1993 which is assigned to the assignee of the present invention. The three dimensional imaging radar system utilizes ultra wideband linear FM millimeter wave radar technology to provide high resolution target information. The three dimensional imaging radar provides continuous long term surveillance of remote areas with full video recording of all surveillance activities. The three dimensional imaging radar uses a dual band radar operating at 56 GHz and at 14 GHz. The three dimensional imaging radar demonstrated the capability to penetrate certain materials such as gypsum (wall) board, wood, and some forms of brick. However, the three dimensional imaging radar cannot see through concrete or stucco structures or barriers because the concrete material has excessive loss for any practical imaging of objects on the other side of the barrier.

More particularly, in an attempt to solve the problem of concrete penetration, laboratory tests were conducted using radars developed by the assignee of the present invention that operate in the frequency range of 500 MHz to 2 GHz. A linear frequency modulated continuous wave (FMCW) radar and an impulse radar were both tested. These low frequency (ultra wide band) radars demonstrated that acceptable attenuation of just a few db was experienced for common reinforced block wall, concrete prefab reinforced walls and. California stucco materials. These tests also demonstrated that a range resolution of approximately 6 inches could be achieved with portable equipment.

The decreased attenuation at the lower frequencies is believed to be related to the size of the "aggregate material" within the concrete relative to the wavelength of the radar energy. The typical size of the sand and rock in the concrete is greater than a quarter wavelength (0.050 inches) at the 56 GHz frequency. At 1 GHz, a quarter wavelength is 3 inches and the concrete appears to influence the wave much less.

One key limitation at these lower frequencies is antenna beam size. A radar operating at 56 GHz can achieve a 0.6 degree pencil beam (two way) which produces a 2 inch beam size at 16 feet. The 56 GHz radar antenna is a 1 foot diameter parabolic dish. A 14 GHz radar uses the same dish antenna and has a 1.5 degree two way beam width. To achieve a 0.6 degree beam at 1 GHz, an antenna with a diameter of 56 feet is required. This is quite impractical, therefore a different technique must be used to achieve acceptable angular resolution for radars operating at the lower frequencies.

Accordingly, it is an objective of the present invention to provide for imaging radar systems that permit imaging of targets located behind obscuring structures, such as concrete and stucco barriers, and the like. It is a further objective of the present invention to provide for imaging radar systems that provide three dimensional imaging of targets located behind obscuring structures.

SUMMARY OF THE INVENTION

The present invention is an imaging radar system, or concrete penetrating imaging radar system, for producing radar images of objects disposed behind obscuring structures, such as concrete and stucco barriers, and the like. The present imaging radar system provides radar signals that penetrate through concrete and stucco walls, and the like, to provide images of objects that are behind them.

A unique time difference of arrival (TDOA) technique is embodied in the present radar to provide radar angle scanning on receive using physically small, portable antennas. While this technique cannot achieve the fine angle resolution of a 56 GHz radar, for example, the present concrete penetrating radar does provide angle resolution on the order of 5 to 10 degrees, depending upon the spacing of the antenna elements.

One embodiment of the present imaging radar system that has been reduced to practice has been shown to penetrate more than one foot of reinforced concrete or equivalent soil thickness. The imaging radar system is light weight, portable, and rugged. The imaging radar system provides target range and azimuth information. Two imaging radars may be simultaneously employed to provide both horizontal scan and vertical scan information, and to create three dimensional image displays. The present radar system is not affected by communication interference, and the radar system also provides more information for object identification than conventional imaging radars.

Laboratory tests of an experimental 1 GHz imaging radar system have demonstrated the detection and location of a person walking from 2 to 60 feet on the opposite side of a 6 inch reinforced concrete wall and a common California style stucco wall relative to the location of the radar system. Experiments were performed with the radar system disposed directly adjacent to the walls and also disposed 30 feet from the walls. The experiments utilized laboratory prototype hardware operating with only 5 milliwatts average power using 12 dB gain antennas. A higher power transmitter may be employed to increase the range of the imaging radar system to well beyond several hundred feet.

The present invention provides the ability to detect, identify, track, and maintain surveillance of threat weapons systems, personnel, and installations. The present invention may be used for police surveillance, drug enforcement, land mine detection and automotive applications. The radar system provides high resolution images of the objects located behind obscuring structures. The radar systems operate in all conditions of visibility and across a broad environmental range.

Sensor types employed in the present radar systems may include thermal, acoustic (sonar), RF, laser, and other electrooptic sensors, and in general, these sensors are man portable.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 4c illustrates an end view of the antenna of FIG. 4a;

DETAILED DESCRIPTION

Figure 1:
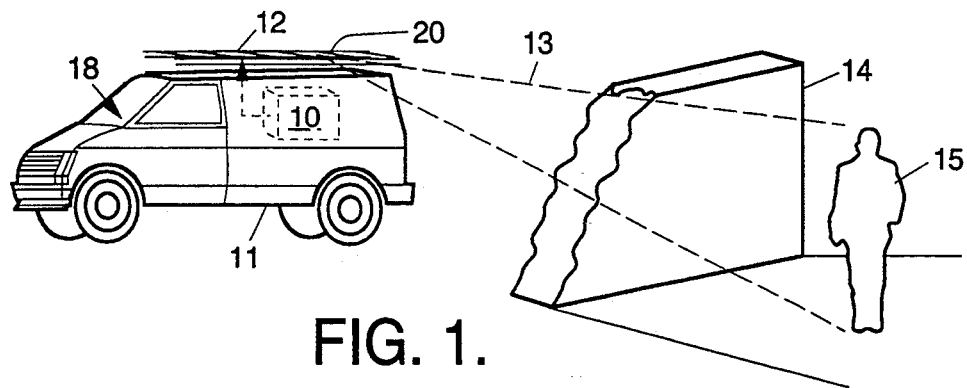
FIG. 1 shows a diagram illustrating an operational scenario employing an imaging radar system in accordance with the principles of the present invention.

Referring to the drawing figures, FIG. 1 shows a diagram illustrating an operational scenario of an imaging radar system 10, or concrete penetrating imaging radar system 10, in accordance with the principles of the present invention. The imaging radar system 10 is disposed on a vehicle 11, for example, and is comprised of an antenna array 12 that is configured in the shape of a folding extension ladder 20, for example, secured to the top of the vehicle 11. Radar signals 13 (illustrated by the dashed beam) are emitted from the antenna 12 and penetrate through a structure 14 or barrier 14, such as a concrete wall 14 or stucco wall 14, for example. The radar signals 13 reflect from a moving object 15, person 15, or target 15, located behind the barrier 14. An image of the moving object 15 or person 15 behind the barrier 14 is generated by the radar system 10 and is displayed on a radar display 18.

Figure 2B:
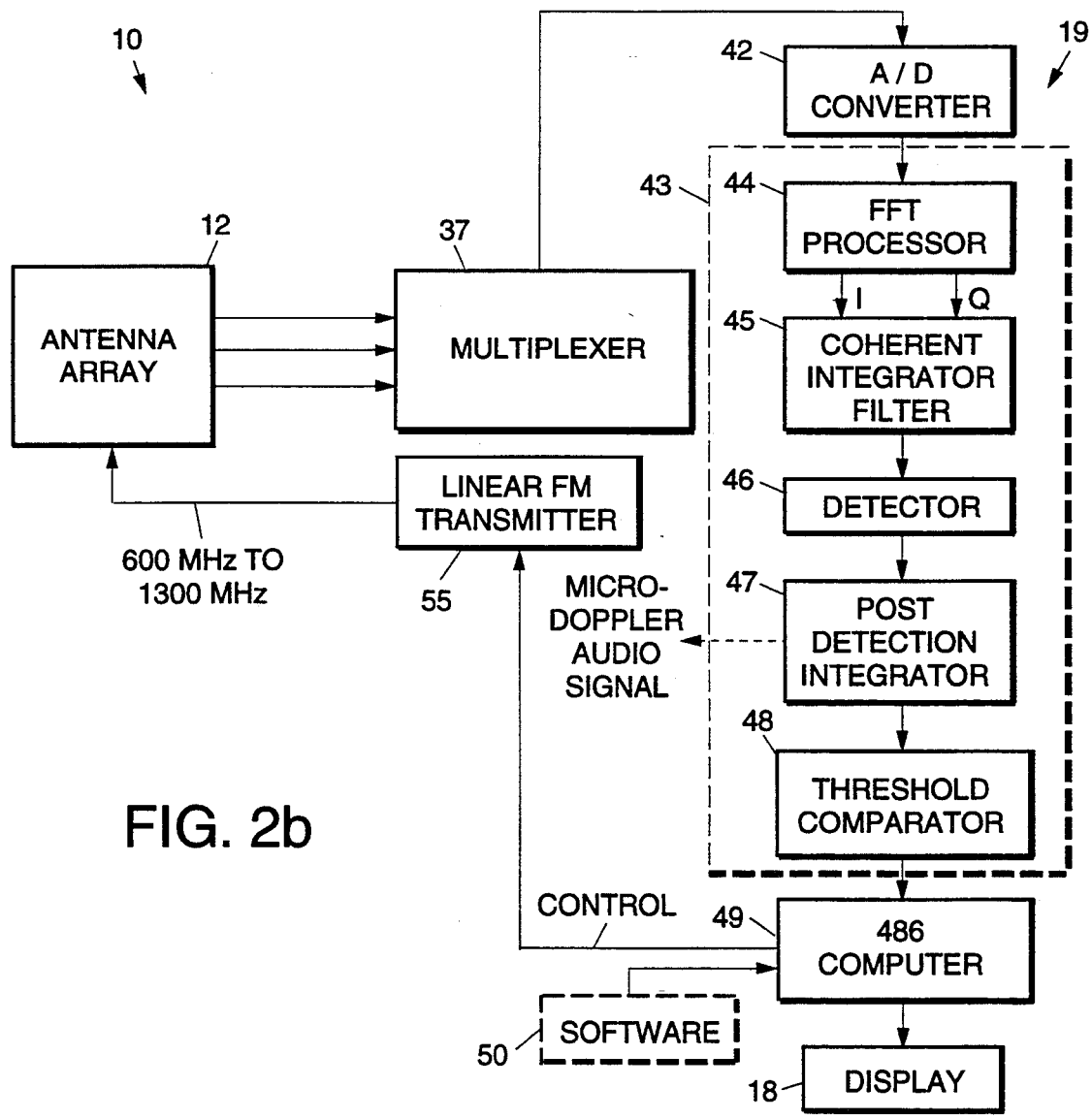
FIG. 2b is a detailed block diagram of the imaging radar system of the present invention detailing the signal processor thereof.
Figure 2A:
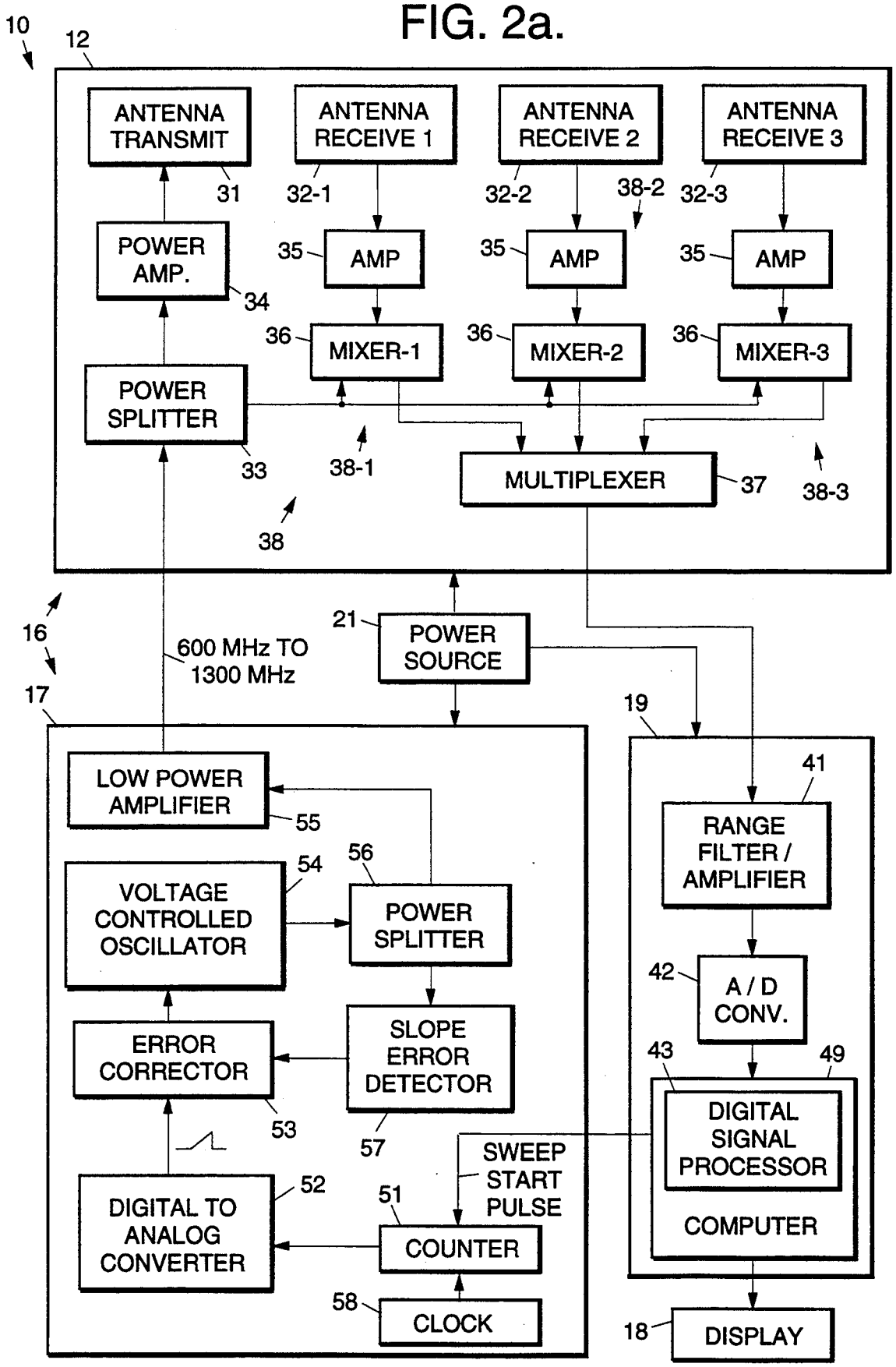
FIG. 2a is a detailed block diagram of the imaging radar system of the present invention detailing the antenna array and transmitter thereof.

FIGS. 2a and 2b are detailed block diagrams of the imaging radar system 10 detailing the antenna array and transmitter, and the signal processor thereof, respectively. Referring to FIG. 2a, it shows a detailed system block diagram of the imaging radar system 10, and in particular details its antenna array 12 and transmitter 17 thereof. The imaging radar system 10 is a motion detecting, concrete penetrating radar system 10 that is adapted to detect moving objects 15 obscured by structures 14 or barriers 14 comprised of common building materials such as wood, stucco and concrete, for example. As is shown in FIG. 2a, the imaging radar system 10 comprises an ultra wideband linear frequency modulated continuous wave radar 16 that includes a low power, frequency tunable, continuous wave (CW) transmitter 17, the antenna array 12, a radar receiver 38, a computer processor 19, a power source 21, and the radar display 18. The antenna array 12 comprises a multi-element, side-looking, CW array antenna array 12, such as is illustrated in FIG. 1. The antenna array 12 is described in more detail with respect to FIGS. 4a–4c below. The antenna array 12 comprises a transmit antenna 31 and three receive antennas 32-1, 32-2, 32-3. The transmit antenna 31 is coupled to the transmitter 17 by way of a power splitter 33 and a power amplifier 34. Each of the receive antennas 32-1, 32-2, 32-3 is coupled by way of a separate receiver 38-1, 38-2, 38-3 that each includes a preamplifier 35 and mixer 36 to a three-port multiplexer 37. The output of the multiplexer 37 is coupled to the computer processor 19.

The low power, frequency tunable, continuous wave (CW) transmitter 17 comprises a counter 51 that is coupled to the computer processor 19 and is adapted to receive a sweep start pulse therefrom. The counter 51 is coupled to a clock 58 that controls its counting. The counter 51 has an output that is coupled to a digital to analog converter 52 which is coupled by way of an error corrector 53 to a voltage controller oscillator 54. The digital to analog converter 52 is adapted to provide a linear sweep signal to the error corrector 53. A power splitter 56 is coupled to the voltage controlled oscillator 54 and provides signals to a slope error detector 57 whose output is coupled to a second input to the error corrector 53, and to a low power amplifier 55 which provides the output of the transmitter 17. The imaging radar system 10 may be adapted to operate at any frequency from 600 MHz to 1.3 GHz.

Figure 3:
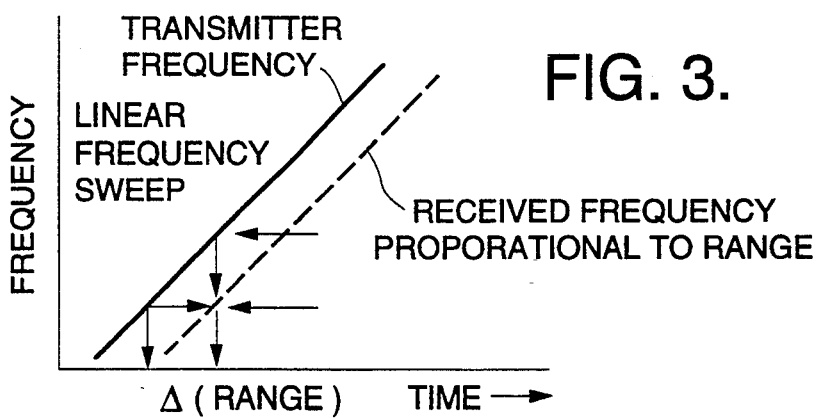
FIG. 3 is a graph illustrating a linear frequency modulated continuous wave (CW) radar signal employed in the imaging radar system of FIGS. 1 and 2.

The transmitter 17 of the imaging radar system 10 provides for an ultra wideband linear frequency modulated continuous wave radar 16. FIG. 3 is a graph illustrating a linear frequency modulated continuous wave (CW) radar signal that is employed by the transmitter 17. The linear frequency modulated continuous wave radar 16 has many advantages over a conventional impulse radar when used to image objects 15 through obscuring structures 14, such as concrete walls, and the like.

The transmitter 17 has an operating frequency ranging from approximately 600 MHz to 1.3 GHz, with a 700 MHz bandwidth. This bandwidth produces approximately 7 inch range resolution. The transmitter 17 is controlled by commands from the signal processor 43. The basic output power level of the imaging radar system 10 is 10 milliwatts for short range operation. A high power amplifier 34 may be provided to increase the radar power level (17 db) when required for longer range operation.

As shown in FIG. 2a, the computer processor 19 comprises a range filter and amplifier 41 whose input is coupled to the output of the multiplexer 37, an analog to digital (A/D) converter 42, a computer 49, and a digital signal processor 43. One output of the computer 49 is coupled to the radar display 18 and a second output is coupled to the transmitter 17.

FIG. 2b is a block diagram of the imaging radar system 10 that details the computer processor 19. The digital signal processor 43 is coupled to an output of the analog to digital converter 42 which receives input signals derived from the multiplexer 37. Outputs of the analog to digital converter 42 are coupled to a fast Fourier transform (FFT) processor 44 that provides an output signal that is filtered by a coherent integrator filter 45 and that is coupled to a detector 46. A post detector integrator 47 generates a micro-doppler audio output signal and provides a signal that is applied to a threshold comparator 48. An output of the threshold comparator 48 is coupled to the computer 49, such as may be provided by an IBM 486 personal computer, for example. The computer 49 is coupled to the display 18 which displays the radar image generated by the system 10. Software 50 is provided that runs on the computer 49 to process the radar signals to generate the radar image.

The imaging radar system 10 has a 700 MHz bandwidth that produces seven inch range resolution. The output power level of the transmitter 17 required to ensure detection of persons 15 at greater than 100 feet is approximately 10 milliwatts. The real world range depends upon a number of factors including concrete moisture content, aspect angle, and other objects located in the surveillance area. Operational experience has shown that these environmental characteristics sometimes limit system performance. A higher power transmitter 17 may be employed to increase the range performance of the imaging radar system 10 with a corresponding increase in prime power and weight.

Figure 4A:
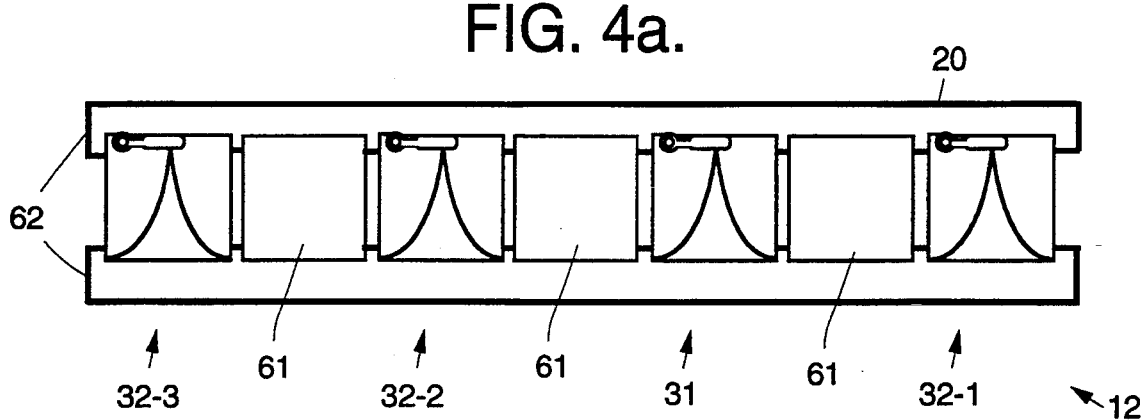
FIG. 4a illustrates a top view of an antenna employed in the imaging radar system of FIG. 1.
Figure 4B:
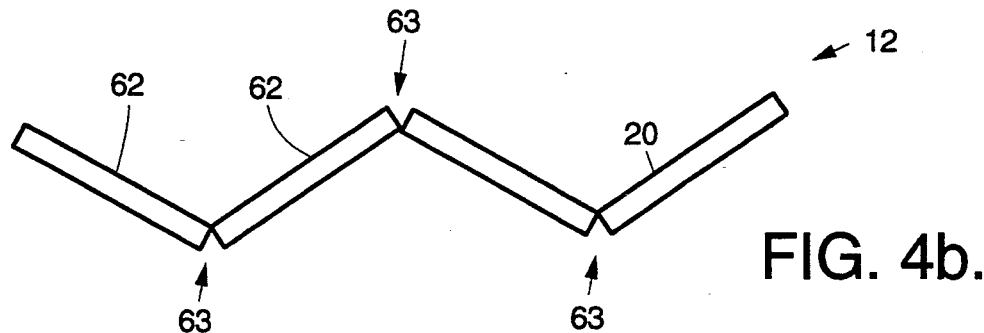
FIG. 4b illustrates an edge view of the antenna of FIG. 4a in a partially folded condition.
Figure 4C:
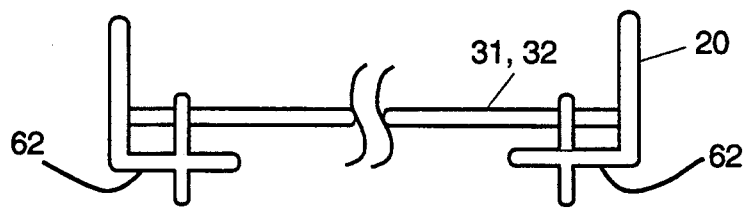

The ultra wideband low frequency radar signals that penetrate concrete or such structures 14 present a challenge for target angle determination. Small, low frequency antennas have broad beam widths and low gain. To achieve a desired angular resolution of 5 degrees, the multi-element side looking array antenna 12 has been developed for use in the imaging radar system 10. The multi-element side looking array antenna 12 is illustrated in FIG. 4, comprising FIGS. 4a–4c. FIG. 4a illustrates a top view of the antenna 12, FIG. 4b illustrates an edge view of the antenna 12 of FIG. 4a in a partially folded condition, and. FIG. 4c illustrates an end view of the antenna 12 of FIG. 4a.

As a specific example, the array antenna 12 may be comprised of from three to five broad-band antenna elements 31, 32, depending upon the requirements of the system 10. One antenna element 31, or transmit antenna 31, is used for transmitting the radar signals. The remaining antenna elements 32-1, 32-2, 32-3 are used for receiving radar return signals reflected from objects 15 behind the barrier 14. The transmit and receive antenna elements 31, 32 are separated from each other by a distance of from 3 to 12 feet using spacers 61 to provide spatial differences necessary to perform time difference of arrival (TDOA) measurements of reflected energy. The receive antenna elements 32-1, 32-2, 32-3 are adapted to resolve the azimuth angle ambiguities that normally occur when using only two receive antenna elements. The spacers 61 and antenna elements 31, 32-1, 32-2, 32-3 are secured together by means of a fiberglass support structure 62. The fiberglass support structure 62 electrically isolates and supports each of the components of the antenna 12.

Each of the four antenna elements 31, 32-1, 32-2, 32-3 is typically square and is fourteen inches on a side. Each of the four antenna elements 31, 32 is approximately one-quarter inch thick. Each of the four antenna elements 31, 32 is connected at its edges to form the array 12 which looks like the extension ladder 20, approximately eight feet long by fifteen inches wide. Each antenna element 31, 32 of the array 12 and the spacers 61 may be folded at its edges, so that the entire array 12 fits in a fourteen inch by twenty-eight inch by six inch suitcase.

The specific configuration for the antenna 12 is highly application dependent. One configuration designed for use by law enforcement agencies has the radar system 10 installed in the form of the folding extension ladder 20 that looks like a common painting ladder, as is illustrated in FIGS. 1 and 4. The transmit and receive antenna elements 31, 32 are substantially identical to each other. The antenna elements 31, 32 are exponentially tapered radiators that comprise rungs of the folding extension ladder 20. They are spaced along the linear support structure 62 that has the form of the folding extension ladder 20. The antenna elements 31, 32-1, 32-2, 32-3 are wide band "exponential taper" arrays designed for optimum performance over the ultra wide bandwidth and low frequency. The transmitter 17, receiver 38, and power source 21 may be distributed along the length of the support structure 62 of the extension ladder 20. The ladder 20 may be carded on the surveillance vehicle 11, and the ladder 20 may be folded for shipment such as is shown in FIG. 4b, wherein ladder rails comprising the fiberglass support 62 are folded by means of folding joints 63.

The signal processor 43 comprises three signal processor channels (implemented by means of the software 50 running on the computer 49 and computer memory) that process amplified signals from each of the three receive antennas 32-1, 32-2, 32-3. The high speed analog to digital converter 42 sequentially converts radar return data from each antenna element 32-1, 32-2, 32-3. The digitized data are converted to six-inch range bins by the fast Fourier transform (FFT) processor 44. Digital signal correlation is performed in the computer 49 to perform scan-on-receive-only processing and target detection. The azimuth angle and range to the imaged objects are converted to a plan position indicator (PPI) display 18 using a conventional personal computer display 18, such as is provided by a portable laptop personal computer, for example. The computer 49 including the signal processor 43 and display 18 may be located up to several hundred feet from the antenna array 12.

The digital signal processor 43 is the heart of the radar system 10. All software 50 that controls the system 10 and processes the radar signals is contained in the computer 49. Because the system 10 is software driven, it may easily be modified to display and process radar signals derived from the radar 16. Because the imaging radar system 10 provides a two dimensional display of range and bearing, the display 18 is greatly simplified. This makes the radar 16 much easier to operate.

To provide for the display of three dimensional radar images, two imaging radar systems 10 may be used, one providing horizontal resolution and the other providing vertical resolution, and the outputs are displayed on a single integrated display 18. The respective antennas 12 of the two radar systems 10 are oriented orthogonal to each other to provide for horizontal and vertical resolution.

The digital signal processor 43 and display 18 may be provided by an IBM type 486 laptop computer, for example. The resolution of the display 18 is a 320 by 200 pixel grid. The data are displayed as a top down view on the display 18. Moving objects 15 and/or fixed objects 15 may be viewed on the display 18. Time history replay and clutter cancellation make tracking of moving objects 15 easy. Selected portions of the display 18 may be zoomed to enhance the displayed images, such as is performed in conventional graphics software. Selected object information may be stored on a computer disk (not shown), or hard copy printed on a printer (not shown) for distribution. This is done in a conventional manner using the computer operating system.

Operation of the imaging radar system 10 will now be discussed. A method of synthetic antenna beam sharpening known as "time difference of arrival" (TDOA) processing is used in the present system 10. In using this type of processing, the radar signals are transmitted from a single transmit antenna 31. At least two separate receive antennas 32-1, 32-2 and receivers 38-1, 38-2 are used to receive the energy reflected from objects 15 within the field of view of the system 10. The angle of an object 15 relative to the receiving antennas 32-1, 32-2 is inferred from the difference in the arrival time at the separated receive antennas 32-1, 32-2.

Figure 5:
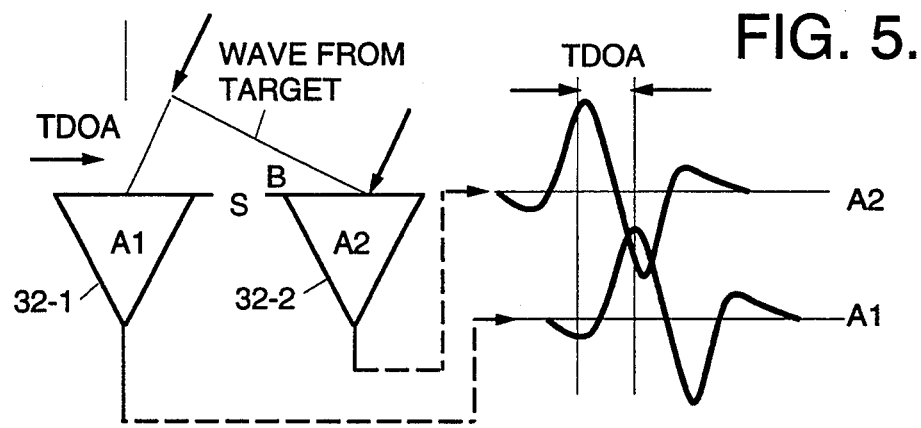
FIG. 5 illustrates the time difference of arrival of a signal received by two receive antennas.

If an object 15 is on a line directly in front of the receiving antennas 32-1, 32-2, the time that it takes the reflected energy to reach both receiving antennas 32 is exactly the same. If the object 15 is to one side or the other of the center, the energy reaches one antenna 32-1 before it reaches the other antenna 32-2. This difference in time is directly related to the angle offset to the object 15. The distance between the receiving antennas 32-1, 32-2 as well as the ability of the computer processor 19 to resolve TDOA determines the ultimate angle resolution of the system 10. Referring to FIG. 5, it illustrates the time difference of arrival of a signal received by two receive antennas 32-1, 32-2. In FIG. 5, the relationship between the receive antennas 32-1, 32-2 and the angle of signal arrival of the radar return signals is shown.

The distance (S) is the center to center spacing between the receive antennas 32-1, 32-2. The velocity (c) of the radar wave is 0.984e9 ft/sec. The time difference is related to the angle offset (B) as follows:

$$TDOA = S/c \cdot \sin(B).$$

For dimensions of S in feet, where c is approximately equal to 1 foot per nanosecond, the range difference of arrival (RDOA) is equal to the TDOA which is:

$$TDOA = S \cdot \sin(B) \text{ nanoseconds} \approx RDOA \text{ (feet)}.$$

To process multiple targets, each receiver must have sufficient range resolution to "isolate" all of the reflecting surfaces in the field of view. In UHF radars, the range resolution is about 0.5 ft. If one of antennas is spaced 10 feet from another antenna, along a line perpendicular to the line of reception, the angle resolution (B) is:

$$B = \sin^{-1}(TDOA/S) = \sin^{-1}(0.5/10) \approx 2.9°.$$

This indicates that two small targets which are at least 1 foot apart in range and separated by at least 2.9 degrees in angle could be isolated on the display.

Figure 6:
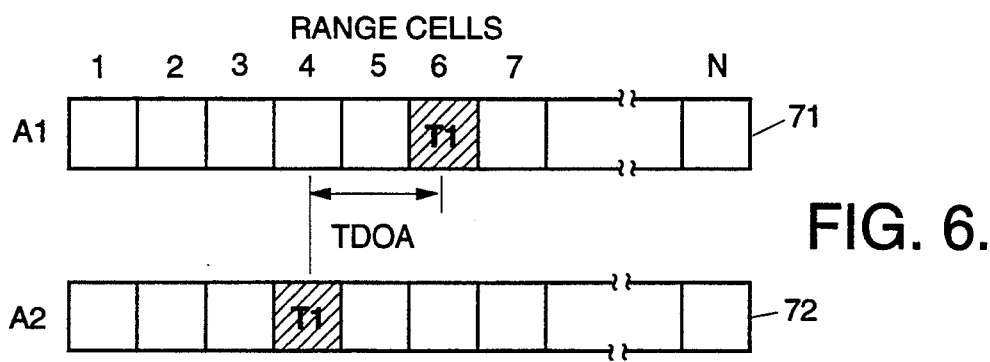
FIG. 6 illustrates shifting of receiver range cells.

TDOA angle scanning on receive only will now be discused. Referring to FIG. 6, receiver range cells for the first and second antennas 32-1, 32-2 are illustrated showing the same object (T1) 15 in difference range cells due to TDOA. The received signals from the first receive antenna 32-1 are processed in the first receiver 38-1. The objects 15 are detected and their amplitude values are placed in range bins. At the same time, the same process is completed in the second receiver 38-2 for the second antenna 32-2. If only a single object 15 is present, the angle to the object 15 is determined by counting the difference in the number of range cells between the first and second antennas 32-1, 32-2 as is shown in FIG. 6. This difference is the TDOA. In this example, if the range cells are six inches apart and the two receive antennas 32-1, 32-2 are four feet apart, then the one foot difference in range means that the true beating (B) to the object 15 is:

$$B = \sin^{-1}(\tfrac{1}{4}) = = 14.5°.$$

This indicates that the object 15 appears closer to the second receive antenna 32-2 than to the first receive antenna 32-1. If the object 15 is in range cell 8 of first receive antenna 32-1, the angle is +29 degrees. If the TDOA places the object 15 from second receive antenna 32-1 in range cell 5 instead of range cell 4 (one cell difference), the bearing to the object 15 is 7.2 degree. An uncertainty exists as to exactly where the object 15 is within the antenna beam, which is normal for any directive antenna. Using TDOA processing, the uncertainty of the location of the object 15 is related to the size of the range cells and is +/−3.6 degrees about the 14.5 degrees angle.

The spacing between each range cell may be correlated to a specific line of bearing relative to the line perpendicular to the plane of the receive antennas 32-1, 32-2. As is illustrated in the example above, +/− one range cell difference represents those objects 15 on the lines of bearing +/−7.2 degrees offset relative to a line perpendicular to the antennas 32-1, 32-2. Those objects 15 that are +/− two range cells are on the lines +/−14.5 degrees, etc. The angle spacing is relatively linear for +/−30 degree scans and spreads rapidly for angles greater than +/−60 degrees. Table 1 below shows the relationship between the range resolution per range cell versus spacing of the antennas 32. The range difference of arrival in feet versus antenna spacing provides antenna scan angle in (+/−) degrees. It also indicates the beam pointing angles of the present "scan on receive" system 10 as is described below. Table 1 shows the linear, one way angle effect. The two way effect is more complex, but is readily compensated for in the software 50 by appropriate programming by those skilled in the art.

TABLE 1

| Antenna Separation (ft) | Range cell diff. (ft) | | | | | | | |
|---|---|---|---|---|---|---|---|---|
| | 0.5 | 1.0 | 1.5 | 2.0 | 2.5 | 3.0 | 3.5 | 4.0 |
| 1 | 30.0 | 90.0 | — | — | — | — | — | — |
| 2 | 14.5 | 30.0 | 48.6 | 90.0 | — | — | — | — |
| 3 | 9.6 | 19.5 | 30.0 | 41.8 | 56.4 | 90.0 | — | — |
| 4 | 7.2 | 14.5 | 22.0 | 30.0 | 38.7 | 48.6 | 61.0 | 90.0 |
| 5 | 5.7 | 11.5 | 17.5 | 23.6 | 30.0 | 36.9 | 44.4 | 53.1 |
| 6 | 4.8 | 9.6 | 14.5 | 19.5 | 24.6 | 30.0 | 35.7 | 41.8 |
| 7 | 4.1 | 8.2 | 12.4 | 16.6 | 20.9 | 25.4 | 30.0 | 34.8 |
| 8 | 3.6 | 7.2 | 10.8 | 14.5 | 18.2 | 22.0 | 25.9 | 30.0 |
| 9 | 3.2 | 6.4 | 9.6 | 12.8 | 16.1 | 19.5 | 22.9 | 26.4 |
| 10 | 2.9 | 5.7 | 8.6 | 11.5 | 14.5 | 17.5 | 20.5 | 23.6 |

Time shift angle scanning will now be discussed with reference to FIG. 6. To detect a object 15 that is directly in front of the radar system 10, each range cell from the first receiver 38-1 is stored in a first memory 71 multiplied by the corresponding range cell in the second receiver 38-2 that is stored in a second memory 72. An output occurs only if the reflecting object 15 is directly perpendicular to the front of the two receiving antennas 32-1, 32-2. This is true for angles near perpendicular, where the RDOA of the object 15 is equivalent to less than 6 inches. When the RDOA becomes greater, the object 15 in the second receiver 38-2 will be in a different range cell (i.e., 4 versus 6).

Figure 7:
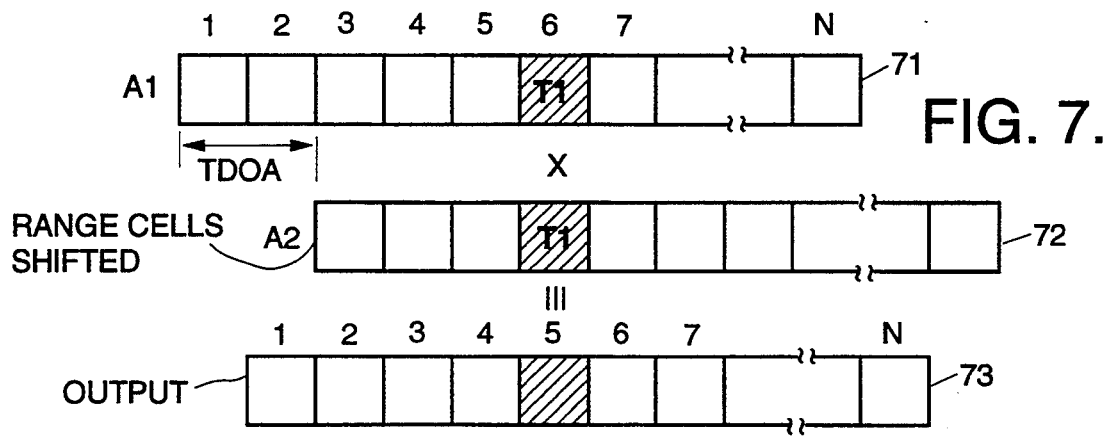
FIG. 7 illustrates time difference of arrival angle scanning.

With reference to FIG. 7, if the range cells in the second receiver 38-2 are shifted in time and are then multiplied (X) in software by those from the first receiver 38-1. The angle offset directly depends on the time offset between the two range cell memories 71, 72. In FIG. 7, the range cells of the second receiver 38-2 are shifted two range cells in time. This shift is proportional to a scan angle shift of 14.5 degrees for all objects 15 if the range cell is six inches and the antenna spacing is four feet.

This process of shifting the second memory 72 one range cell to evaluate the objects 15 at the corresponding angle continues for each set of range cells until the number of range cells equals the antenna separation distance. The process is then repeated, shifting the second set of range cells in the negative time direction to evaluate all of the objects 15 on the other side of a center line of the antenna array 12. The true range to the object 15 is determined by the total range shift (one half the range cell difference) as shown by the output 73 resulting from the multiplication.

Using the data in Table 1, a spacing of four feet between the antennas 32-1, 32-2 and a range cell spacing of 0.5 feet provides eight bearing scan lines on each side of center out to +/−90 degrees. It also shows that, as the spacing between the antennas 32-1, 32-2 increases, so does the number of scan lines that are available. The trade-off becomes that of antenna spacing versus the number of scan lines (or resolution) on the display 18.

This simple TDOA approach works well for a single object 15, but produces ambiguities for more than one object 15 within the antenna beam width with just two receive antennas 32-1, 32-2. With two Objects 15 there are four possible solutions for the locations of the object 15. To solve this problem, three receive antennas 32-1, 32-2, 32-3 with different spacings are required. The degree of angle resolution and ambiguity reduction are a function of the spacing between each of the receive antennas 32-1, 32-2, 32-3. The present system 10 allows for modification of this spacing to optimize system performance. As an additional processing mode, moving target data only may used by the correlation processing in the computer 49 in order to provide for enhanced display of the objects.

In operation, and referring again to FIGS. 2a and 2b, the voltage controlled oscillator (VCO) 54 operates from 600 MHz to 1300 MHz in high resolution mode. This VCO 54 is colocated with the low power amplifier. A coax cable is used to interconnect the low power amplifier 55 and the antenna array 12. The power splitter 33 and power amplifier 34 are mounted directly to the transmit antenna 31. The power splitter 33 provides three additional outputs that feed the local oscillator signal to each of the three receiver mixers 36. One low noise preamplifier 35 and mixer 36 are contained within each receiver 38.

The output of each mixer 36 is applied to the three port multiplexer 37 (which may be located on one of the receiver antennas 32) which switches between receivers 38 on successive linear FM sweeps of the radar 16. The multiplexed output is filtered and amplified prior to being applied to the analog to digital converter 42.

Figure 8:
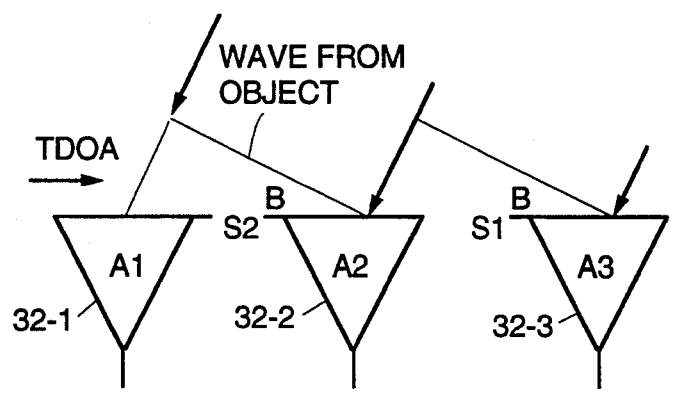
FIG. 8 illustrates the time difference of arrival of a signal received by three receive antennas.

FIG. 8 illustrates the time difference of arrival of a signal received by three receive antennas 32-1, 32-2, 32-3. Three or more antennas 32 may be employed to resolve ambiguities. The processing of received angle of arrival data is performed as described above, but for respective pairs of antennas 32-1, 32-2, and 32-2, 32-3, and 32-1, 32-3. The radar signal processing reduces ambiguities and provides for the detection of extended targets, such as a long wall, for example.

Thus there has been described new and improved imaging radar systems that produce radar images of objects that are located behind obscuring barriers such as concrete and stucco walls, for example. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An imaging radar system for generating images of objects disposed behind an obscuring structure, said system comprising:
    a low power, frequency tunable, continuous wave transmitter;
    an antenna array coupled to the transmitter that comprises a transmit antenna and a plurality of receive antennas;
    a radar receiver coupled to the antenna array;
    a computer processor coupled to the radar receiver that comprises a digital signal processor and a computer, and wherein the computer processes radar return signals derived from the objects using time difference of arrival processing to provide radar angle scanning upon receipt of the radar return signals from the objects;
    a radar display coupled to the computer; and
    a power source coupled to the antenna array, the transmitter, the radar receiver, and the computer processor for providing power thereto.

2. The radar system of claim 1 wherein the antenna array is configured in the shape of a folding extension ladder.

3. The radar system of claim 1 wherein the antenna array comprises a multi-element, side-looking, continuous wave array antenna array.

4. The radar system of claim 1 wherein the receiver comprises a plurality of individual receivers coupled to individual ones of the receive antennas, and wherein each individual receivers includes a preamplifier and mixer.

5. The radar system of claim 1 which further comprises a three-port multiplexer coupled between each of the mixers and the computer processor.

6. The radar system of claim 1 wherein the transmitter comprises:
    a counter coupled to the computer processor for receiving a sweep start pulse therefrom;
    a clock coupled to the counter that controls its counting;
    a digital to analog converter coupled to the counter for providing a linear sweep output signal;
    an error corrector coupled to the digital to analog converter;
    a voltage controller oscillator coupled to the error corrector;
    a power splitter coupled to the voltage controlled oscillator;
    a slope error detector coupled to the error corrector; and a low power amplifier coupled to the power splitter that provides the output of the transmitter.

7. The radar system of claim 1 wherein the computer processor comprises:
   a range filter and amplifier coupled to the multiplexer;
   an analog to digital converter coupled to the range filter and amplifier;
   a computer coupled to the analog to digital converter; and
   a digital signal processor coupled to the computer.

8. The radar system of claim 1 wherein the digital signal processor comprises:
   a fast Fourier transform processor that provides an output signal that is filtered by
   a coherent integrator filter coupled to the fast Fourier transform processor for filtering an output signal received therefrom;
   a detector coupled to the coherent integrator filter;
   a post detector integrator coupled to the detector for generating a micro-doppler audio output signal;
   a threshold comparator coupled to the post detector integrator and to the computer; and
   software that runs on the computer for processing the radar signals to generate the radar image.

9. The radar system of claim 1 which further comprises:
   a plurality of spacers separating each of the antennas; and
   a support structure coupled to the plurality of spacers and plurality of antennas to electrically isolate and support them.

10. The radar system of claim 1 wherein the transmit and receive antenna elements are separated from each other by a distance of from 3 to 12 feet.

11. The radar system of claim 1 wherein each of the antennas is square.

12. The radar system of claim 9 wherein the antenna array further comprises a plurality of joints to permit folding of the array.

13. The radar system of claim 9 wherein the transmitter, receiver, and power source are disposed along the length of the support structure.

* * * * *